(12) United States Patent
Schliwa et al.

(10) Patent No.: US 8,851,420 B2
(45) Date of Patent: Oct. 7, 2014

(54) INTEGRATION OF SUPPLY FUNCTIONS IN A STORAGE COMPARTMENT

(75) Inventors: Ralf Schliwa, Dollern (DE); Martin Frey, Hamburg (DE); René Stoll, Hamburg (DE); Andreas Tolksdorf, Hamburg (DE); Uwe Schneider, Jork (DE)

(73) Assignee: Airbus Operations GmbH, Hamburg (DE)

( * ) Notice: Subject to any disclaimer, the term of this patent is extended or adjusted under 35 U.S.C. 154(b) by 82 days.

(21) Appl. No.: 13/244,442

(22) Filed: Sep. 24, 2011

(65) Prior Publication Data
US 2012/0012707 A1    Jan. 19, 2012

Related U.S. Application Data

(63) Continuation of application No. PCT/EP2010/052536, filed on Mar. 1, 2010.

(60) Provisional application No. 61/162,800, filed on Mar. 24, 2009.

(30) Foreign Application Priority Data

Mar. 24, 2009  (DE) .......................... 10 2009 014 599

(51) Int. Cl.
*B64D 11/00*   (2006.01)
*B64D 13/00*   (2006.01)

(52) U.S. Cl.
CPC .......... *B64D 11/003* (2013.01); *B64D 2231/02* (2013.01); *B64D 2013/003* (2013.01); *B64D 2011/0053* (2013.01); *B64D 2011/0038* (2013.01); *Y02T 50/46* (2013.01)

USPC ...................................... 244/118.5; 244/117 R

(58) Field of Classification Search
USPC ........................................... 244/117 R, 118.5
See application file for complete search history.

(56) References Cited

U.S. PATENT DOCUMENTS

| | | | | |
|---|---|---|---|---|
| 4,763,859 A | * | 8/1988 | Biagini | 244/118.5 |
| 4,830,096 A | * | 5/1989 | Biagini | 244/118.5 |
| 5,108,048 A | * | 4/1992 | Chang | 244/118.1 |
| 5,347,434 A | | 9/1994 | Drake | |

(Continued)

FOREIGN PATENT DOCUMENTS

| | | |
|---|---|---|
| DE | 102006007285 A1 | 8/2007 |
| DE | 102007030331 A1 | 1/2009 |

(Continued)

OTHER PUBLICATIONS

International Preliminary Report on Patentability dated Oct. 6, 2011 for International Application No. PCT/EP2010/052536.

(Continued)

*Primary Examiner* — Philip J. Bonzell
*Assistant Examiner* — Marc Burgess
(74) *Attorney, Agent, or Firm* — Ingrassia Fisher & Lorenz, P.C.

(57) ABSTRACT

Integration of supply functions is provided in a storage compartment. In particular, an integrated module is provided, which can be mounted in the overhead area of a passenger cabin, and exhibits different system components, which are automatically hooked up to the supply system of the transport (e.g., an aircraft) during the mechanical installation of the module on the load-bearing structure of the cabin.

16 Claims, 7 Drawing Sheets

(56) References Cited

U.S. PATENT DOCUMENTS

| | | | |
|---|---|---|---|
| 5,651,733 A * | 7/1997 | Schumacher | 454/76 |
| 6,883,753 B1 * | 4/2005 | Scown | 244/118.1 |
| 2007/0284479 A1 | 12/2007 | Pein et al. | |
| 2008/0071398 A1 | 3/2008 | Kneller et al. | |
| 2008/0078871 A1 | 4/2008 | Munson et al. | |
| 2008/0283662 A1 * | 11/2008 | Park | 244/118.5 |
| 2009/0283636 A1 | 11/2009 | Saint-Jalmes et al. | |
| 2010/0012780 A1 * | 1/2010 | Kohlmeier-Beckmann et al. | 244/118.5 |
| 2010/0014009 A1 | 1/2010 | Stavaeus et al. | |
| 2010/0206985 A1 | 8/2010 | Rahlff | |
| 2011/0147520 A1 * | 6/2011 | Schneider | 244/118.5 |
| 2011/0240796 A1 * | 10/2011 | Schneider | 244/118.5 |

FOREIGN PATENT DOCUMENTS

| | | |
|---|---|---|
| DE | 102009014599 A1 | 9/2010 |
| EP | 1803645 A1 | 7/2007 |
| WO | 2009003945 A1 | 1/2009 |

OTHER PUBLICATIONS

International Search Report dated Oct. 28, 2010 for International Application No.: PCT/EP2010/052536.

* cited by examiner

INTEGRATION OF SUPPLY FUNCTIONS IN A STORAGE COMPARTMENT

CROSS-REFERENCE TO RELATED APPLICATION

This application is a continuation of International Application No. PCT/EP2010/052536, filed Mar. 1, 2010, which was published under PCT Article 21(2) and which claims priority to German Patent Application No. 102009014599.0 filed Mar. 24, 2009 and of U.S. Provisional Patent Application No. 61/162,800 filed Mar. 24, 2009, the disclosure of which applications is hereby incorporated herein by reference.

TECHNICAL FIELD

The technical field relates to the furnishing of cabins in transport means. In particular, the technical field relates to an integrated module for being mounted in the overhead area of a cabin in a transport means, a transport means with a module, as well as the use of such a module in an aircraft.

BACKGROUND

In aircraft cabins, the storage compartment modules (also referred to as overhead storage bins or "hat racks") and adjacent components and systems of the aircraft, such as cables, pipes, hoses, etc., are most often standalone and secured to the interior structure (hereinafter also referred to as load-bearing structure) of the aircraft, separately from each other. As a result, the different components have to be built into the aircraft fuselage or aircraft interior one after the other. This yields long assembly times, and consequently high costs while manufacturing or retrofitting the aircraft.

DE 10 2007 030 331 A1 and WO 2009/003945 A1 describe storage compartment modules for the interior of an aircraft, which exhibit a so-called passenger service channel area (PSC area) that is rigidly joined to the housing of the storage compartment. After the storage compartment has been installed in the aircraft, the components of the supply channel are built in and hooked up to the aircraft supply.

At least one object is to simplify the configuration and outfitting of the cabin in a transport means. In addition, other objects, desirable features and characteristics will become apparent from the subsequent summary and detailed description, and the appended claims, taken in conjunction with the accompanying drawings and this background.

SUMMARY

One exemplary embodiment an integrated module to be mounted in an overhead area of the cabin in a transport means. The module is designed to hold luggage items and provide PSU (passenger service unit) functionality. The module exhibits at least one system component for supplying a passenger, and at least one interface for connecting the system component to a supply line of the transport means.

An "integrated" module is provided, which contains the system components required to handle the power supply and other passenger needs already prior to installation in the cabin area. These system components are integrated into the module. Also provided are corresponding interfaces, with which the system components can be hooked up to the corresponding supply lines of the transport means. In particular, the module does not have to be outfitted with system components, lines, interfaces, etc. after the fact once the module has been secured in the cabin. No additional system components have to be provided for supplying passengers in the cabin. All necessary components are installed in the module.

Therefore, an autonomous hat rack is provided, which can be tested already prior to installation in the cabin, so as to minimize the actual installation outlay. In particular, the individual modules can be individually outfitted and configured depending on the desired cabin layout. The interfaces inside the cabin need not be changed for this purpose. They can incorporate universal standard interfaces, which exhibit all required system connections. One or the other module can now be hooked up, depending on the desired cabin configuration. Since this shifts the installation outlay from the aircraft cabin to the module manufacturer, the amount of work that goes into cabin configuration can be economized. It also saves on weight, since the cabin does not have to be provided with any redundant system connections to enable various cabin layouts. Weight can be economized in this way.

In another exemplary embodiment, the module exhibits additional system components to be used by the passenger and/or to supply the passenger. Already before it is installed in the cabin, the module exhibits all system components needed by the passengers, along with the corresponding interfaces for hooking system components up to the supply lines of the transport means.

In another exemplary embodiment, the system components involve components selected from the following group: cabin lighting, air outlet, reading lamp and display.

In another exemplary embodiment, the display is arranged in a display channel and designed as a display strip, which extends over the entire length of the module.

As a result, the various modules can be incorporated at different positions in the longitudinal direction of the cabin, or the seat configuration can be varied, while still being able to optimally provide each seat with information. This is enabled by the fact that information can be shown at various locations of the display strip depending on activation (e.g., via an onboard, central processing unit).

In another exemplary embodiment, the display channel further exhibits an element selected from a group consisting of touch-sensitive film, lifejacket channel and oxygen channel.

In another exemplary embodiment, the display is designed as an OLED strip (i.e., an organic light-emitting diode strip). The characters displayed on the OLED strip are automatically depicted at a suitable location, for example depending on the installation position of the corresponding module and/or the position relative thereto of a passenger seat lying underneath it. For example, the central processing unit of the transport means can automatically detect where what module is located (i.e., where it was hooked up). In addition, the central processing unit can find out where what row of seats is located, so that the seat information and/or other data is always displayed at the right locations. This can all take place fully automated, with no user intervention required.

In another exemplary embodiment, the module exhibits an individual channel to supply the passenger. The individual channel encompasses air nozzles, and serves to replace a conventional PSU.

In another exemplary embodiment, the module exhibits an upper attachment area with one or more upper attachment elements for securing a module to one or more upper attachment points (e.g., on an attachment rail) of the transport means. Also provided is at least one lower attachment element, which is used to secure the module to a lower attachment point or a lower attachment rail of the transport means. For example, the upper attachment elements can be hooked into the upper attachment points, and the module can then be pivoted at the upper suspension points into the assembly position, until the lower attachment elements latch into the lower attachment points.

In another exemplary embodiment, the interface is designed for automatically hooking up the system components to the supply line of the transport means while securing the module to the attachment points. In other words, the system components are automatically connected to the supply lines of the transport means while the module is being secured to the attachment points. For example, the interfaces involve a type of plug-in connections that are snapped together when the module is pivoted into the assembly position. This makes it possible to greatly reduce the installation outlay.

In another exemplary embodiment, the module exhibits an interface for connecting at least one of the system components to a data bus or a data bus system of the transport means. This makes it possible to automatically address the module after it has been installed in the cabin. In this way, the central processing unit of the transport means determines where what module is located, and can then suitably activate the corresponding modules.

Another exemplary embodiment provides a transport means with a module described above and below.

In another exemplary embodiment, the transport means exhibits an arithmetic and control unit for controlling the individual system components. In particular, the arithmetic and control unit is also used to detect the connection positions of the individual modules relative to the seats in the cabin.

In another exemplary embodiment, the transport means is an aircraft, such as a helicopter, airship or airplane. It can also be a rail vehicle, a watercraft or a surface vehicle.

In another exemplary embodiment, the transport means is designed to adjust a position of displayable characters on the display as a function of the position of the module in the cabin.

Another exemplary embodiment indicates the use of a module described above and below in an aircraft.

The exemplary embodiments described here and below equally relate to the module, transport means and application. In other words, the features described in the following, for example in relation to the module, can also be implemented in the transport means, and vice versa.

BRIEF DESCRIPTION OF THE DRAWINGS

The present invention will hereinafter be described in conjunction with the following drawing figures, which are schematic and not to scale, and where like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
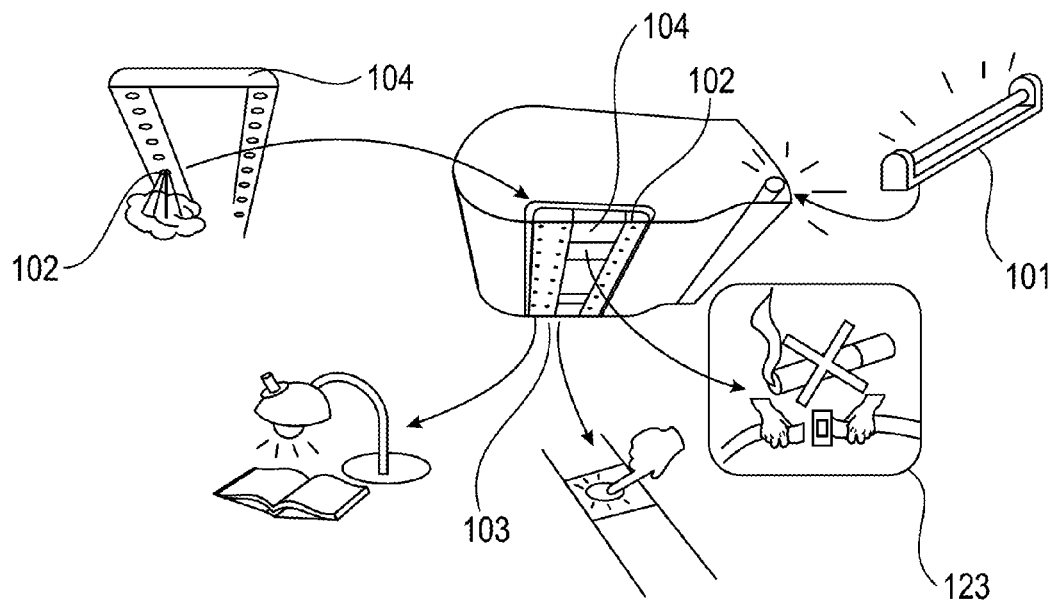
FIG. 1 shows several depictions of a module and its components according to exemplary embodiments.
Figure 1A:
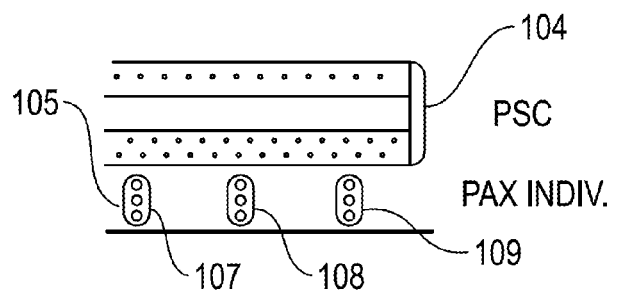
FIG. 1A is a schematic illustration of a display channel according to exemplary embodiments.
Figure 1B:
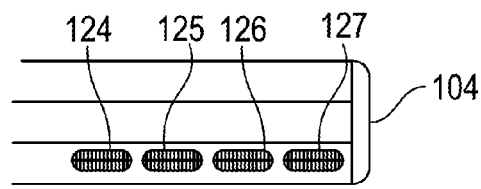
FIG. 1B is a schematic illustration of a display channel according to exemplary embodiments.
Figure 1C:
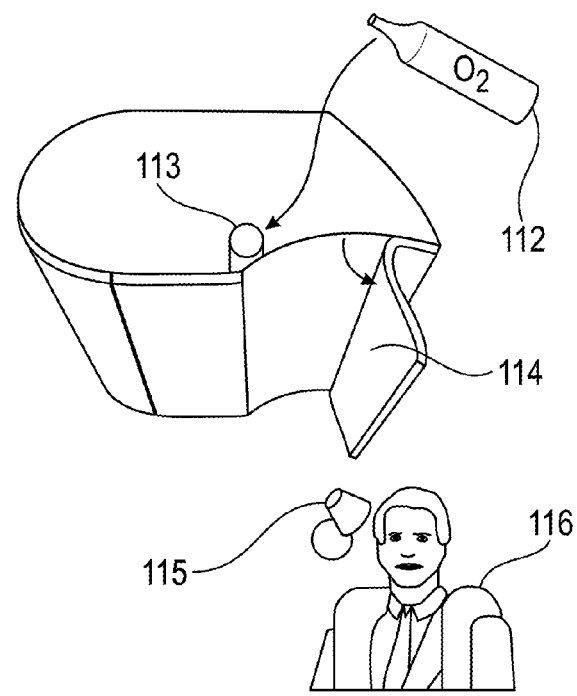
FIG. 1C is a partially exploded schematic illustration of a module and its components according to exemplary embodiments.
Figure 1D:
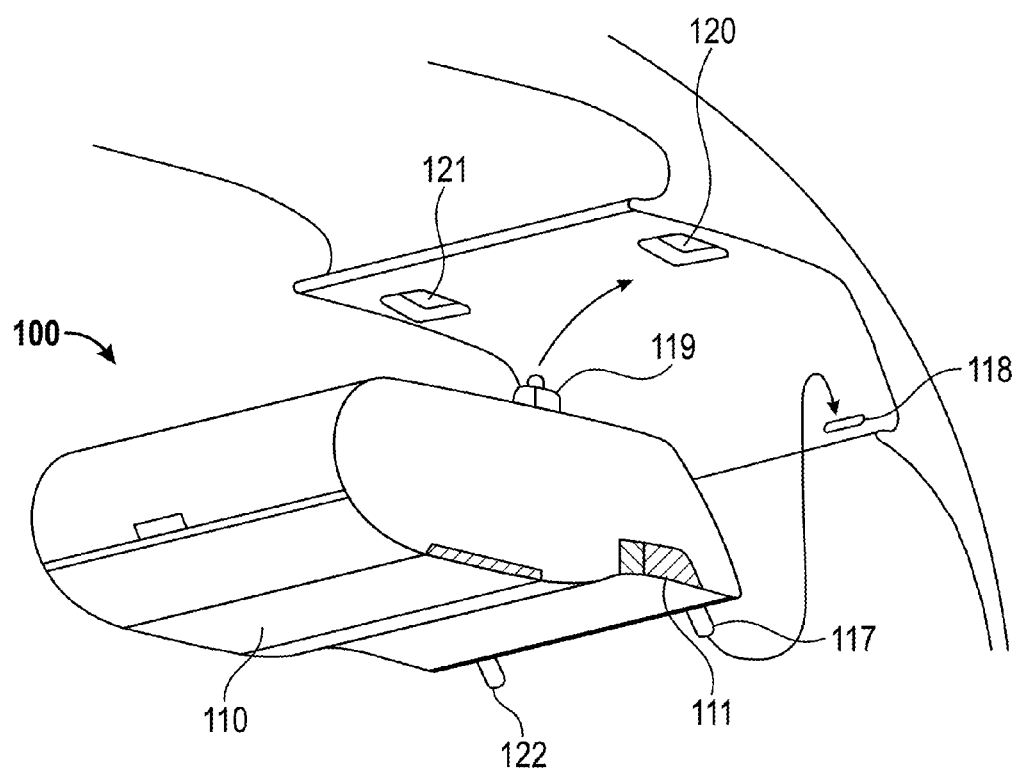
FIG. 1D is a partially exploded schematic illustration of a module that is secured to an aircraft.

FIG. 1 shows an integrated module 100, the system components integrated therein, as well as part of the cabin of a transport means. In particular, the integrated module 100 exhibits cabin lighting 101, for example in the form of a fluorescent tube, air outlets 102, reading lamps 103 situated in a reading lamp channel, as well as a display channel 104 with additional functions. For example, the display channel 104 exhibits a display strip, e.g., in the form of an OLED. It can also exhibit a so-called touch-sensitive film (touch film), a lifejacket channel and an oxygen channel. For example, the oxygen channel is designed as an autonomous oxygen channel.

In addition, a so-called Pax Indiv channel 105 is provided, meaning an individual passenger channel. For example, the Pax Indiv channel 105 exhibits a slit pipe, a sliding shade, actuated bimetals and/or an excess number of air nozzles (i.e., more air nozzles than actually needed). When shifting the rows of seats around, this makes it possible to ensure that each passenger is always optimally supplied. In addition, a conventional PSU channel can be adapted as a special solution (see also FIG. 8).

The bottom side of the module 100 integrates a strip-type element 110 that exhibits a display channel (e.g., in the middle), and to the left or right of that the reading lamp 103 and an air nozzle channel with a plurality of air nozzles 102. In particular, this module 100 can be provided with touch-sensitive sensors, with which the light function and/or air nozzle functions can be controlled, for example. In addition, the display channel 104 is designed in such a way that it can display certain characters 123, for example the fasten seatbelts sign, no smoking sign or other information or warning signs.

The channel 104 can be designed in various ways. In particular, different elements can be optionally combined in this strip. In particular, various air nozzle arrangements 107, 108, 109 and/or various reading lamp arrangements 124, 125, 126, 127 can be provided. The strip-type element 110 is integrated into the integrated module 100 at the factory during its fabrication, so that the module is outfitted according to the individual user wishes already prior to installation into the cabin of the transport means. Standard interfaces are provided inside the module, which permit the integration of various strip-type element 110 into the module as needed, depending on customer requirements.

The module 100 further exhibits several attachment elements (e.g., upper attachment points 122 and lower attachment points 117, 123), which can be used to secure the module to the load-bearing structure of the transport means cabin.

The load-bearing structure of the cabin is provided with attachment points 121, 120 for the upper attachment, into which the upper attachment elements 119 can be snapped or hooked. Also provided are lower attachment points 118, for example which can be joined with the lower attachment points 117, 122 by pivoting the module around the upper attachment points 120, 121. It is also possible to first hook the module with its lower attachment points 117, 122 into the attachment points 118, and only then pivot it upward, so that the attachment elements 119 snap into the corresponding points 120, 121 (so-called snap and click connection).

Also provided is an emergency supply channel 111, which exhibits a downwardly opening flap 114. Situated above the channel at location 113 is an oxygen supply unit, for example in the form of a compressed gas cylinder 112. This oxygen supply unit is hooked up to a breathing mask 115, which drops down to the passenger when the flap 114 opens. This emergency channel 111 also exhibits one or more lifejackets 116, which also drop down to the passenger when the flap 114 opens.

Figure 2:
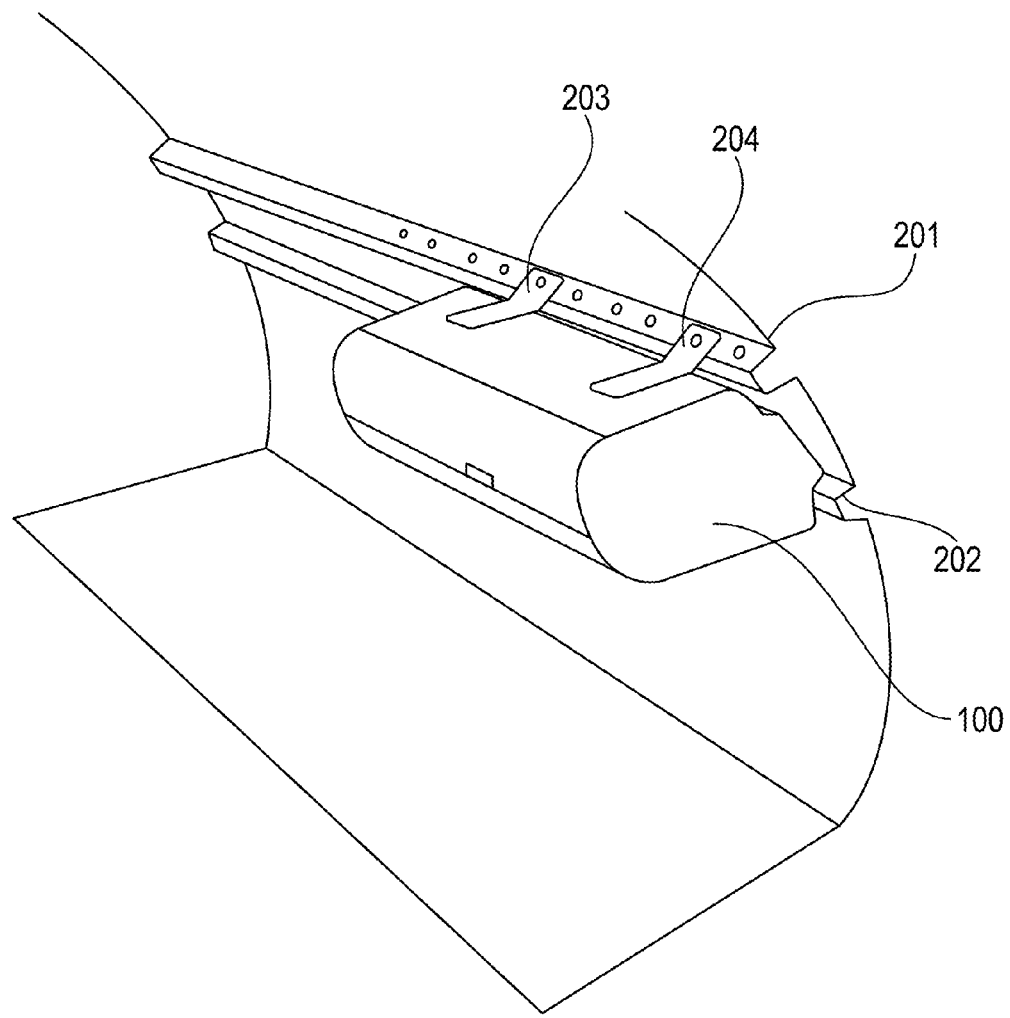
FIG. 2 shows a module according to an exemplary embodiment that is secured to a load-bearing structure of an aircraft.

FIG. 2 shows an integrated module 100, which is secured to the load-bearing structure 201, 202 of the cabin. Evident therein are the upper attachment elements 203, 204, which are hooked into the upper rail 201. The upper rail is a continuous rail for mounting purposes, and for ensuring dimensional stability. The lower area of the module 100 sits on the lower rail 202, and if necessary is secured thereto by means of a snap and click connection.

Figure 3:
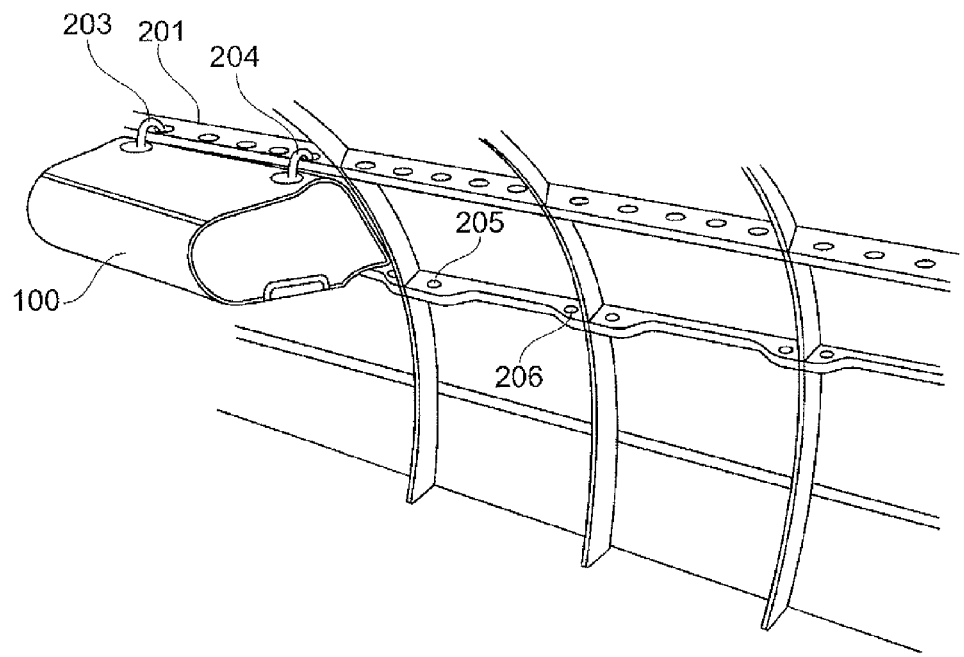
FIG. 3 shows a module according to another exemplary embodiment, which is also secured to a load-bearing structure of an aircraft.

FIG. 3 shows a module 100 according to another exemplary embodiment. The module 100 has hook-shaped upper attachment elements 203, 204, which are hooked into corresponding holes or oval recesses in an attachment rail 201. Also visible on the lower attachment rails are the corresponding recesses 205, 206 into which the lower attachment elements of the module 100 are hooked or latched. Naturally, the module can also be secured to the aircraft cabin structure in another manner.

Figure 4:
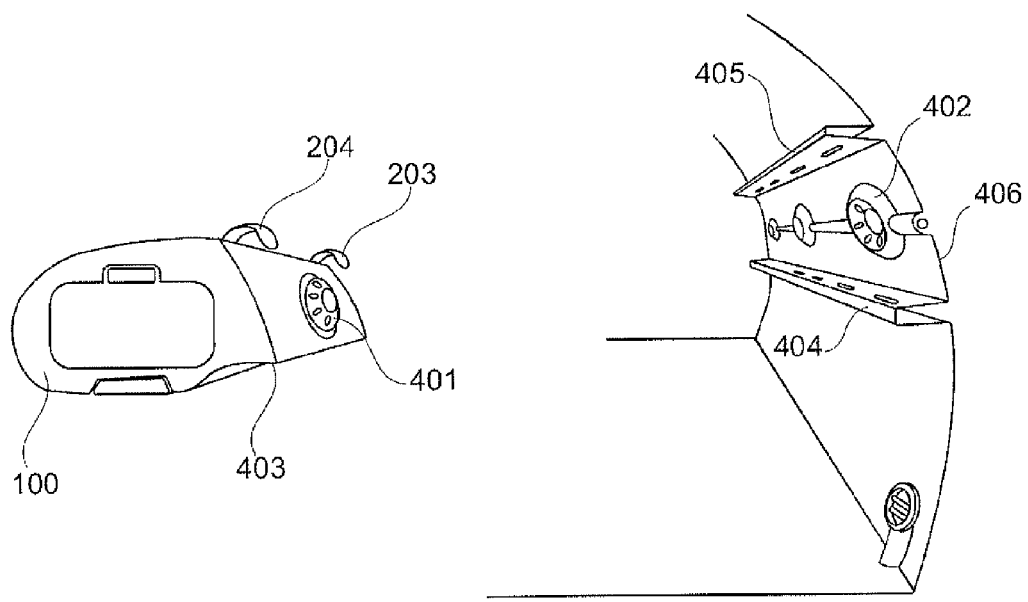
FIG. 4 is an exploded view of another module that illustrates its attachment position according to another exemplary embodiment.

FIG. 4 shows a module 100 that also has two hook-shaped upper attachment elements 203, 204. The rear lower edge 403 of the module sits on the lower carrier 404 after the module has been snapped on and the cabin wall 406. The installation process takes place in such a way that the two hooks 203, 204 are first hooked into the corresponding recesses in the upper carrier 405. The module is then pivoted, so that the interface 401 of the module is introduced into the corresponding counter-interface 402 of the cabin wall. In this way, the system components of the module are automatically connected to the supply system of the transport means.

The rails 405 or 404 can serve as power feedback loops, in particular given a fuselage with a CFK design. The lower attachment of the module 100 can involve the frame, i.e., take place in the area of the frame. The connection of the electrical contacts (i.e., the electrical hookup) of the electrical consumers in the module to the aircraft supply system takes place automatically during the installation of the module on the load-bearing structure. No separate operation is optimally required for this purpose.

Figure 5:
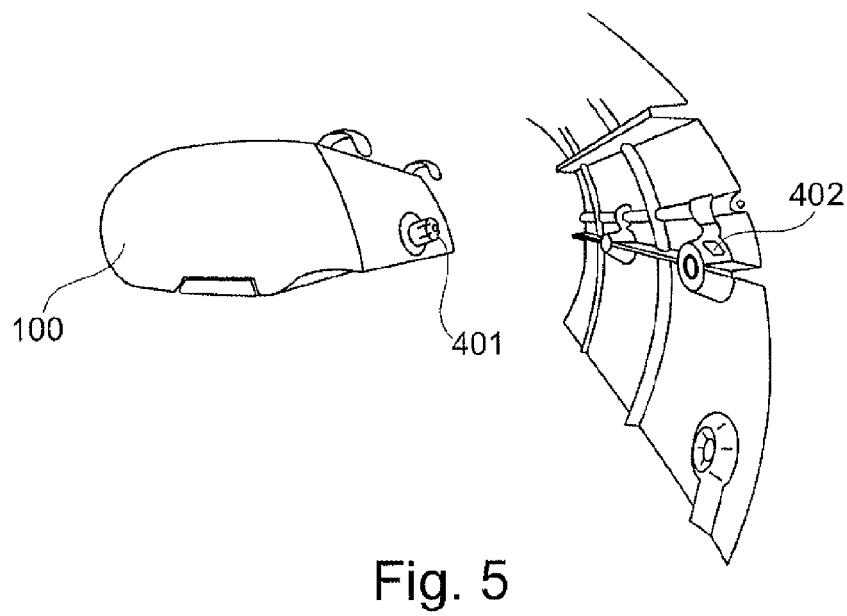
FIG. 5 is an exploded view of another module that illustrates its attachment position according to another exemplary embodiment.

FIG. 5 shows a module 100 with an interface terminal 401 having a somewhat different design, which is introduced into the corresponding counter-interface terminal 402 of the aircraft supply system while snapping the module onto the aircraft wall.

Figure 6:
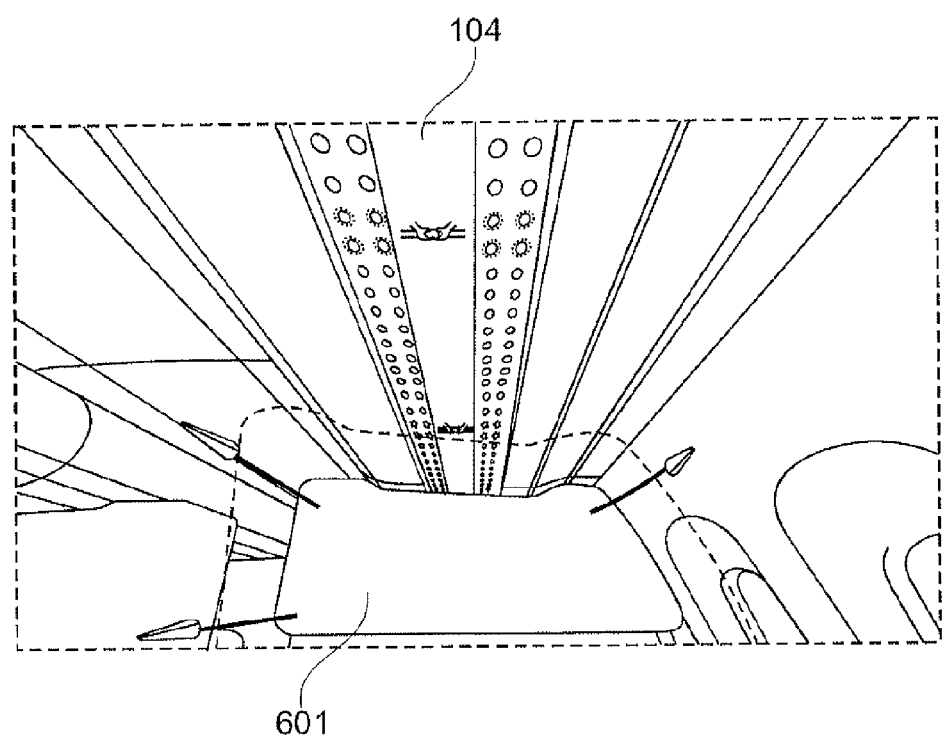
FIG. 6 shows an area of an aircraft cabin according to an exemplary embodiment.

FIG. 6 shows a separating wall 601 of an aircraft cabin, which can be shifted in the longitudinal direction of the aircraft, depending on how the different classes are dimensioned (economy/business, $1^{st}$ class). As evident from FIG. 6, the display channel 104 can flexibly respond to changing seat configurations, since the different lighting elements exhibit a comparably tight module width.

Figure 7:
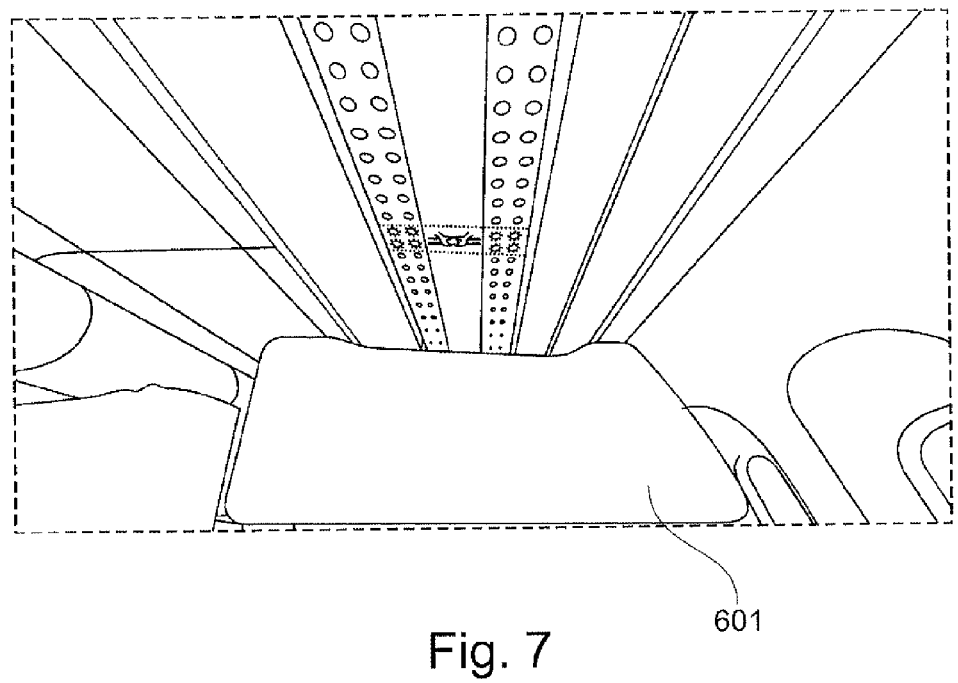
FIG. 7 shows another area of the aircraft cabin according to an exemplary embodiment.

FIG. 7 shows the same cabin section as FIG. 6, but the wall 601 is shifted further toward the front.

Figure 8:
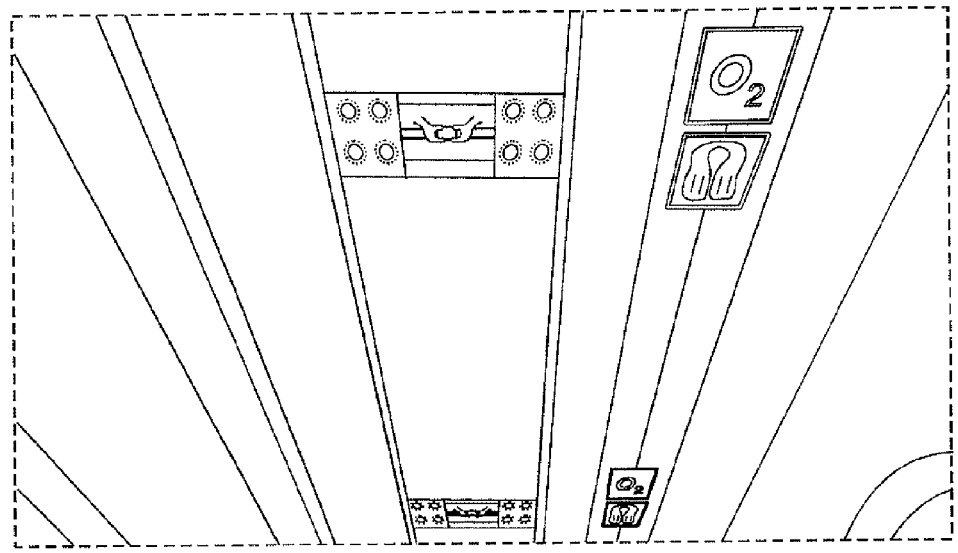
FIG. 8 shows another area of the aircraft cabin according to an exemplary embodiment.

As evident from FIG. 8, a conventional PSU channel can also be integrated into the module 100.

Figure 9:
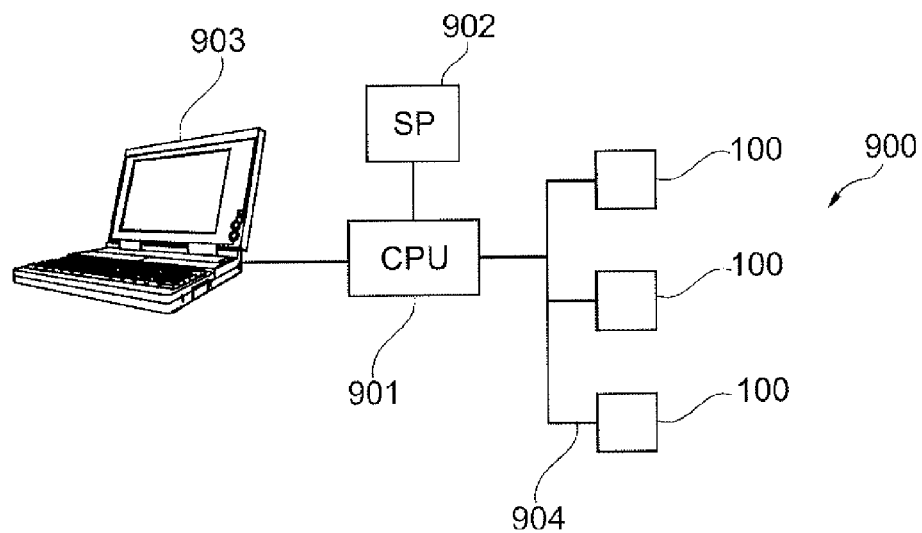
FIG. 9 shows a module system according to an exemplary embodiment.

FIG. 9 shows a module system 900 that can be built into a transport means, for example an aircraft. The module system 900 exhibits a central processing and control unit 901 hooked up to a storage unit 902. Also provided is an input/output unit 903, with which the processing and control unit 901 can be controlled and programmed.

The processing and control unit 901 is connected to a bus system 904, to which the various modules 100 are hooked up. Just by installing the modules 100, the processing and control unit 901 detects the position within the aircraft at which each individual module is located. In addition, the processing and control unit detects where the passenger seats are, so that the modules can each be suitably actuated. In particular, the modules can be automatically addressed. In addition, it is possible to individually actuate the reading lamps and allow the light signals to migrate along with the shifted seats, for example. This is all program-controlled. The interface 401 can be a combined interface, which permits connection to the oxygen supply, air conditioning and electrical power supply systems of the aircraft. Ensured in particular is the actuation of the oxygen supply system, actuation of the lifejacket cover and automatic connection to the air conditioning system during installation of the module.

The integrated module is complete and pretested before being snapped into holding fixtures on the cabin ceiling provided for this purpose. For example, these holding fixtures can exhibit interfaces that provide PSU functionalities in the overhead module. In addition, the modules can exhibit display channels, which extend over the entire length of the cabin, for example, in the form of OLED strips. As a consequence, these display channels are able to provide displays in practically any longitudinal position of the aircraft cabin. Software generates individual displays tailored to the current seat positions. This makes it possible to avoid manually adjusting at least the display units, since everything can be automatically realized by way of software.

Figure 10:
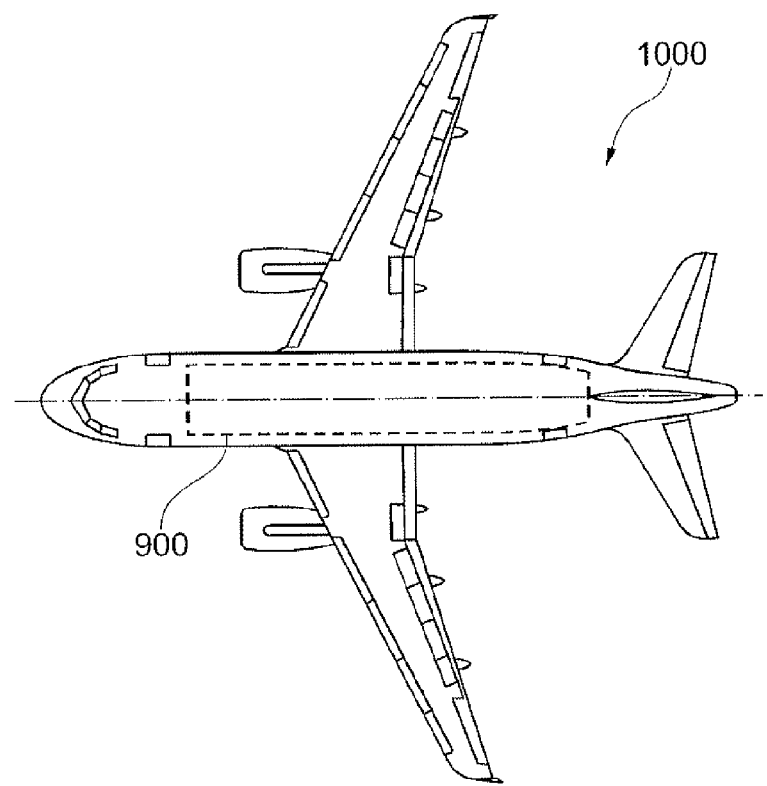
FIG. 10 shows an aircraft according to an exemplary embodiment.

FIG. 10 shows an aircraft 1000 with a module system 900 described above, which exhibits several of the modules described above, as well as a central arithmetic and control unit.

In addition, let it be noted that "comprising" and "exhibiting" do not preclude other elements or steps, and that "an" or "a" do not rule out a plurality. Let it further be noted that features or steps described with reference to one of the above exemplary embodiments can also be used in combination with other features or steps from other of the above exemplary embodiments.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft, comprising:
a passenger cabin having a cabin wall;
a first rail directly coupled to the cabin wall that extends continuously along the cabin wall from a front end of the passenger cabin to near a rear end of the passenger cabin along a first axis substantially parallel to a longitudinal axis of the aircraft;
a second rail directly coupled to the cabin wall that extends continuously along the cabin wall from a front end of the passenger cabin to near a rear end of the passenger cabin along a second axis substantially parallel to the longitudinal axis and the first axis, the first axis different from the second axis;
a first interface directly coupled to the cabin wall of the aircraft between the first rail and the second rail and spaced apart from the first rail and the second rail;
a pivotable integrated module for mounting in an overhead area of the passenger cabin for holding luggage items and providing PSU functionality comprising:
a system component for use by a passenger in the passenger cabin;
a second interface that connects the system component to a supply line of the first interface of the aircraft;
an upper attachment element configured to secure the pivotable integrated module to the first rail of the cabin wall by hooking the pivoted integrated module into the first rail; and
a lower attachment element configured to secure the pivotable integrated module to the second rail of the cabin wall,
wherein the second interface automatically connects the system component to the supply line of the aircraft when the pivotable integrated module is pivoted around one of the first rail and the second rail of the cabin wall, and is secured to the other of the second rail and the first rail; and
wherein, when the pivotable integrated module is pivoted, the second interface of the pivotable integrated module is introduced into the corresponding first interface of the cabin wall.

2. The aircraft of claim 1,
wherein the pivotable integrated module comprises as system components at least one component selected from a group consisting of a cabin light, an air outlet, a reading lamp, or a display.

3. The aircraft of claim 2,
wherein the display is arranged in a display channel and configured as a display strip that extends over an entire length of the pivotable integrated module.

4. The aircraft of claim 3,
wherein the display channel further comprises an element selected from a group consisting of: a touch-sensitive film, a lifejacket channel, or an oxygen channel.

5. The aircraft of claim 3,
wherein the display is an OLED strip, and
wherein characters displayed on the OLED strip are automatically depicted at a suitable location depending on an installation position of the pivotable integrated module, and a position relative thereto of a passenger seat lying underneath.

6. The aircraft of claim 1, the pivotable integrated module further comprising:
an individual channel configured to supply the passenger, the individual channel comprising air nozzles and configured to replace the PSU.

7. The aircraft of claim 1, the pivotable integrated module further comprising:
a third interface configured to connect at least one of the system components to a data bus system of the aircraft to automatically address the pivotable integrated module after the installation in the cabin.

8. The aircraft of claim 1, further comprising:
a processing and control unit configured to control individual system components.

9. The aircraft of claim 1,
wherein by installing the pivotable integrated module, the processing and control unit determines at which position in the aircraft the pivotable integrated module is located,
wherein the aircraft is configured to adjust a position of displayable characters on a display as a function of the position of the pivotable integrated module in the cabin.

10. The aircraft of claim 1, wherein the first rail comprises a series of first recesses corresponding to the upper attachment element provided in the pivotable integrated module.

11. The aircraft of claim 10, wherein the second rail comprises a series of second recesses corresponding to the lower attachment element provided in the pivotable integrated module.

12. The aircraft of claim 11, wherein the series of second recesses on the second rail are spaced at intervals sufficient to connect to the corners of the pivoted integrated module after placement.

13. The aircraft of claim 11, wherein the series of second recesses are substantially oval-shaped.

14. The aircraft of claim 10, wherein the series of first recesses are substantially circular in shape.

15. The aircraft of claim 10, wherein the first rail and second rail are integral with the cabin wall.

16. The aircraft of claim 10, wherein the first rail and second rail extend along the cabin wall so as to receive a plurality of pivotable integrated modules.

* * * * *